United States Patent Office 3,140,971
Patented July 14, 1964

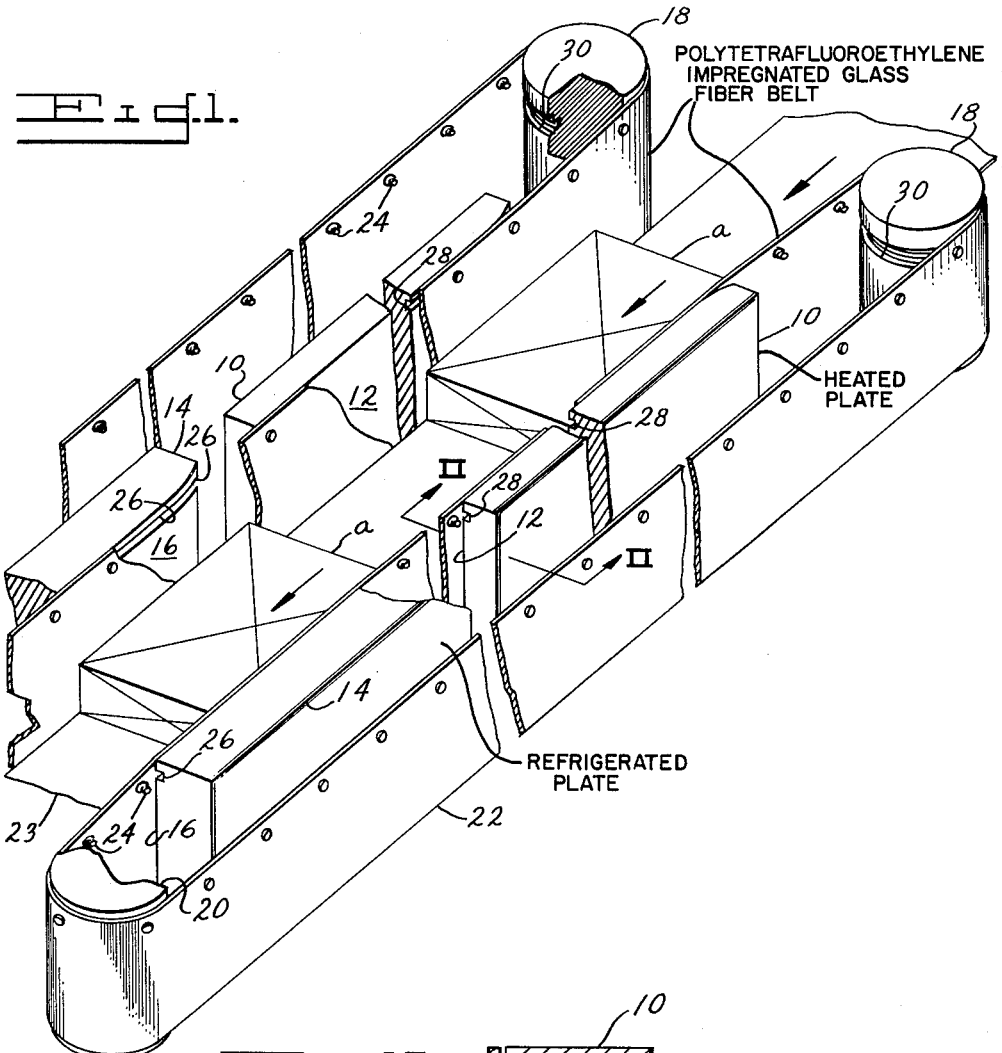
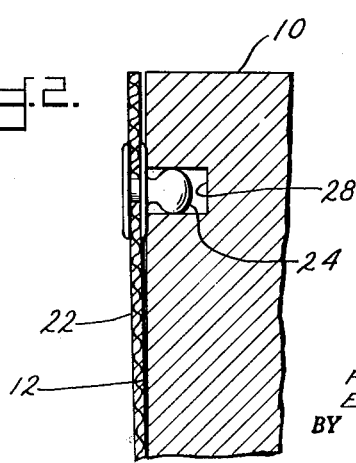

3,140,971
HEAT SEALING CHANNEL
Francis Crescenzo and Earle J. Fredette, Springfield, Mass., assignors to Package Machinery Company, East Longmeadow, Mass., a corporation of Massachusetts
Filed Mar. 14, 1962, Ser. No. 179,650
3 Claims. (Cl. 156—498)

The present invention relates to an improved heat sealing channel for sealing seams on the vertical faces of articles wrapped with films of polyethylene or like material.

In the packaging industry the use of new heat sealable films has posed many serious problems in recent years. Polyethylene has been particularly difficult to seal because its sealing temperature so closely approaches its melting temperature and also because this material will adhere to the usual surfaces employed for heat sealing instrumentalities. In a further specialized area of packaging it has been found extremely difficult to heat seal the end folds of a polyethylene wrapper folded against the end faces of a carton or similar article.

Heat sealing two superposed layers of film is relatively easy, but the end folds of an over-wrapped article may present as many as 5 or 6 superposed layers in certain areas. In order to obtain an effective seal in these areas, it is necessary that both heat and pressure be applied. An effective seal, of course, is one that is airtight and vapor tight to take full advantage of the protective properties of the polyethylene film and preserve the freshness of the articles which are being packaged. Simply tacking the end folds is not sufficient in the majority of cases.

In wrapping machines forming such end folds, it has been a conventional practice to provide heated plates between which the articles are passed in direct contact therewith to seal the end folds of more conventional films. The articles are then advanced past refrigerated plates to set the seals. In this manner pressure may be applied to the lapped end folds as they are sealed and the pressure maintained while the seals are cooled and set. It has been found that by interposing endless belts between the wrapped articles and the vertical faces of the heated and refrigerated plates, that satisfactory heat sealing of these end folds can be obtained where polyethylene wrappers are being used.

The material of which these belts is made is of great importance in that it must be heat resistant and have a disaffinity for molten or semi-molten polyethylene. Glass fiber fabric belts impregnated with polytetrafluoroethylene have been found satisfactory and are used extensively even though their cost is fairly substantial. As herein used, the term polytetrafluoroethylene glass fiber belts will include equivalent belts having similar heat resistant properties and a disaffinity for molten or semi-molten polyethylene or the like.

In spite of the good results which have been obtained, a very serious problem remains in being able to track these vertically disposed belts around the pulleys over which the belts are trained. The length of the belts is so great that they tend to ride off the pulleys and whatever compensating or adjusting means are provided becomes quite delicate in adjustment. The problem, of course, is aggravated in that the temperature gradient across the belt both in a longitudinal and transverse direction is constantly changing.

Various attempts have been made to overcome this problem in putting in tiltable idler rolls and flanged pulleys which are intended to prevent the belt from deviating from a fixed path of travel. Unfortunately, the adjustable idler rolls are very critical so that the belt will tend to stray from its fixed course and eventually expose the heated plate which will then become fouled with polyethylene and also ride over a corner of the pulley injuring the belt. The expedient of using flanged pulleys in combination with flanged guideways has limited effectiveness, but tends to cause undue wear on the longitudinal edges of the belt. If there is not an immediate failure of the belt, the heated plate will oftentimes become exposed and fouled by the heated polyethylene.

All of the solutions heretofore tried, including those mentioned above, have resulted in undue wear and a relatively short life for the belts. As indicated above, these belts are relatively expensive and the cost of frequent replacement becomes a substantial item.

Accordingly, the object of the present invention is to overcome the problems of tracking elongated polytetrafluoroethylene glass fiber belts in heat sealing channels employed in heat sealing the end folds of polyethylene wrapped articles and to eliminate undue wear on these belts in so doing.

The above and other related objects as well as the novel features of the invention will be apparent from a reading of the following description of the disclosure found in the accompanying drawing and the novelty thereof pointed out in the appended claims.

In the drawings:

FIG. 1 is a perspective view diagrammatically showing a heat sealing channel for polyethylene wrapped articles embodying the present invention; and FIG. 2 is a section on an enlarged scale taken on line II—II in FIG. 1.

The heat sealing channel shown in FIG. 1 comprises a pair of heated plates 10 having opposed, vertically disposed surfaces 12 and a pair of refrigerated plates 14 having opposed, vertically disposed surfaces 16. The surfaces 12 and 16 on one side of the sealing channel lie on a common vertical plane, while the surfaces 12 and 16 on the opposite side of the sealing channel also lie on a common vertical plane parallel to the first vertical plane and spaced therefrom.

The sealing channel further comprises a pair of pulleys 18 at the inlet end thereof and a second pair of pulleys 20 (only one of which is shown) at the discharge end thereof. A belt 22 is trained around the pulleys 18 and 20 on one side of the sealing channel, and a second belt 22 is trained around the pulleys 18 and 20 on the opposite side of the sealing channel. The pulleys 18 and 20 on each side of the sealing channels are disposed so that the belts 22 will lie substantially flat against the surfaces 12 and 16 on each side of the folding channel. It is, of course, understood that the present disclosure is diagrammatic and that idler pulleys may be provided to properly tension the belt and also to provide the driving power for the belt, if desired.

The folding channel may also comprise a third belt 23 trained around pulleys, not shown, to support and assist in the advancing of wrapped articles *a* through the sealing channel. A heated plate and a refrigerated plate may be disposed beneath the belt 23 to seal and lap the seam on the undersurface of the articles, as desired.

The means for heating the plates 10 and the means for cooling the plates 14 comprise conventional electrical heating elements and compression refrigeration apparatus of known design and connected to the plates 10 and 14, respectively, in a conventional manner, not shown.

The sealing channel just described is usually mounted adjacent and as a part of a wrapping machine having means for advancing wrapped articles thereto. The wrapping instrumentalities have previously completely enfolded the articles in wrappers and in the usual course made a plurality of folds in the wrapper which have been layed against the ends of the articles. The folds and the seams formed thereby are heat sealed as the articles are advanced between the plates 10. The plates 10 are spaced apart an adjustable distance so that whatever pressure is required for an effective seal may be obtained. After being advanced past the plates 10, the articles are carried past the refrigerated plates 14, which are also adjustably spaced with the plates in order that the heat seal may be set as pressure is preferably maintained. After being carried past the plates 14, the articles are ready for discharge from the heat sealing channel.

As indicated above, it is contemplated that the articles $a$ will be enfolded in polyethylene film wrappers. Therefore the belts 22 are preferably formed of polytetrafluoroethylene impregnated glass fiber cloth so that the semi-molten polyethylene will not adhere thereto as the heat sealed seals are being formed. In order that these belts will track properly across the plates 10 and 14, a series of studs 24 are mounted on the belts 22. A groove 26 is formed in each of the plates 14 to receive the studs 24 projecting from the belt 22 traveling therepast. A groove 28 is formed in each of the plates 10 as a continuation of the groove 26 to also receive the studs 24 projecting from the belt 22 traveling therepast. The studs 24 are spaced apart on a horizontal line adjacent the top edge of the belts 22 and preferably spaced above the articles $a$.

It will also be noted that the pulleys 18 and 20 are provided with grooves 30 which grooves may have an annular marginal relief to accommodate the heads of the studs 24; these heads are best seen in FIG. 2. The marginal relief, as seen in FIG. 1, is exaggerated inasmuch as the heads of the studs are only in the order of .030 inch or less.

The guiding means provided by the studs 24 in the grooves 26 and 28 have been found highly effective in maintaining the travel of the belts along a given path, particularly with respect to the plates 10 and 14 regardless of the temperature differentials which exist in various portions of the belt both in a longitudinal and lateral direction. These temperature differentials result in contraction and expansion of different portions of the belt which ordinarily cause the belt or portions thereof to deviate from this given path so that it would not track properly.

The sealing channel thus described is highly effective in sealing polyethylene wrapped articles with the belt being properly tracked at all times. Further, the belts employing the tracking means thus described have a relatively long life which, in the end, makes them less expensive than ordinary belts without the guide means of the present invention.

While the guide means herein described show the guiding grooves (26 and 28) actually formed in the plates 10 and 14, it is to be understood that separate grooved pieces mounted on or adjacent these plates would be considered equivalents.

Having thus described the invention, what is claimed as novel and desired to be secured by Letters Patent of the United States is:

1. A sealing channel comprising a pair of vertically disposed pulleys, a heated plate and a refrigerated plate disposed between said pulleys, said plates being in side-by-side relation and each having a vertical surface disposed in a common plane, a polytetrafluoroethylene impregnated glass fiber belt trained around said pulleys, said pulleys being disposed so that the belt lies against said vertical surfaces, said belt being advanceable across said surfaces, said plates having aligned horizontal grooves in said vertical surfaces and said belt having guide means projecting therefrom and entering said grooves to maintain the belt in a given path of travel relative to said plates regardless of temperature gradients existing longitudinally and laterally of said belt.

2. A sealing channel comprising on one side a first pair of vertical pulleys, a heated plate and refrigerated plate disposed between said pulleys in side-by-side relation and each having a vertical surface disposed in a common plane, an endless polytetrafluoroethylene impregnated glass fiber belt trained around said pulleys, said pulleys being disposed so that said belt lies against said vertical surfaces, said belt being advanceable across said vertical surfaces, a second pair of vertically disposed pulleys on the other side of said sealing channel, said second pair of pulleys being disposed respectively generally opposite said first pair of pulleys, a second heated plate having a vertical surface opposed to the vertical surface of the first heated plate, a second refrigerated plate having a vertical surface opposed to the first refrigerated plate, the vertical surfaces of said second heated plate and second refrigerated plate lying in a common plane parallel to and spaced from the first common plane, an endless polytetrafluoroethylene impregnated glass fiber belt trained around said second pair of pulleys, said second pair of pulleys being disposed so that the belt lies against the said vertical surfaces of the second heated plate and the second refrigerated plate, the second belt being advanceable across the named vertical surfaces, the plates on one side having aligned horizontal grooves in said vertical surfaces and the plates on the other side of the sealing channel also having aligned horizontal grooves in said vertical surfaces and said belts having guide means projecting therefrom and entering the grooves in the surfaces that they are advanced across to maintain the belts in a given path of travel relative to said plates regardless of temperature gradients which exists laterally and longitudinally on the belts.

3. A sealing channel as in claim 2 wherein the guide means are disposed closely adjacent the upper edges of the named vertical surfaces so that the guide means may be disposed above the articles being sealed, and further wherein the pulleys are relieved to provide clearance for said projecting guide means, and further wherein the guide means comprise studs projecting from said belts and entering said grooves, said studs being spaced apart along the lengths of said belts.

References Cited in the file of this patent

UNITED STATES PATENTS

| | | |
|---|---|---|
| 1,692,832 | Harrison | Nov. 27, 1928 |
| 2,276,744 | Smith et al. | Mar. 17, 1942 |
| 2,375,065 | Askue | May 1, 1945 |
| 2,392,695 | Rohdin | Jan. 8, 1946 |
| 2,680,470 | Stanton | June 8, 1954 |
| 2,800,162 | Rohdin | July 23, 1957 |
| 2,870,490 | Freedlander | Jan. 27, 1959 |

FOREIGN PATENTS

| | | |
|---|---|---|
| 114,269 | Australia | Nov. 19, 1941 |